Jan. 9, 1945.  S. E. JESSUP  2,367,030
END PISTON RING
Filed Jan. 16, 1943
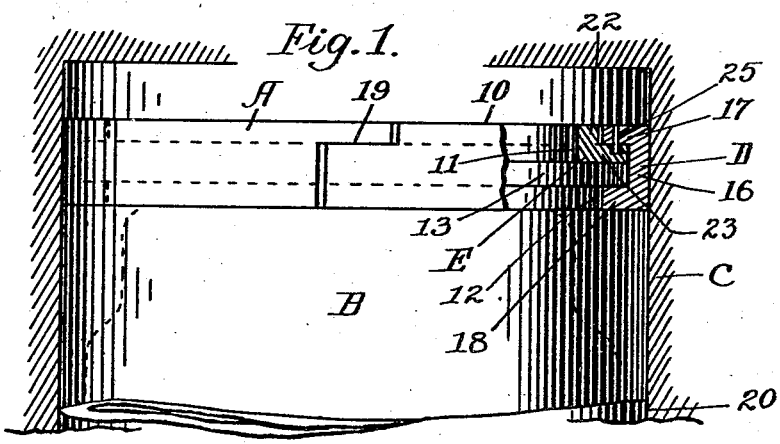
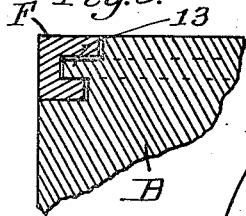
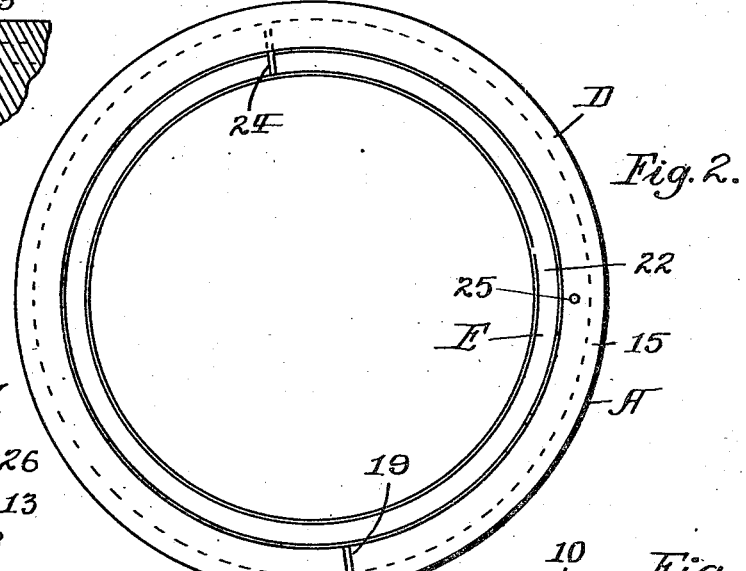
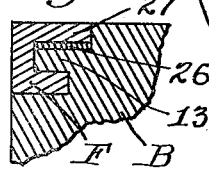
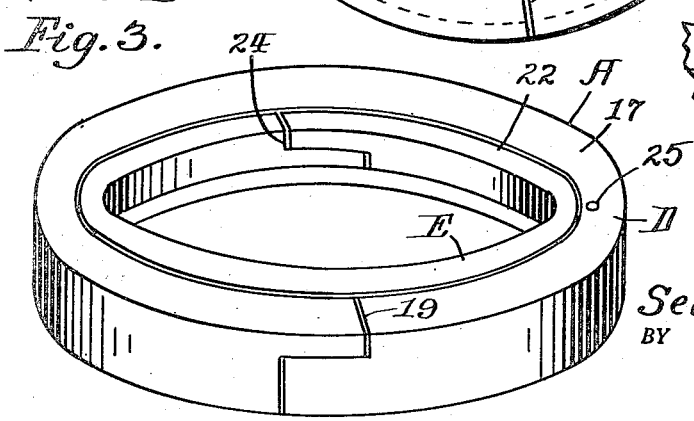
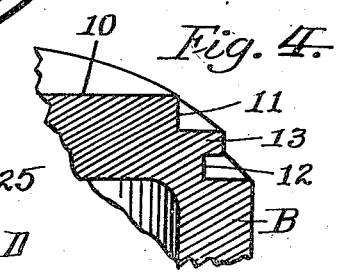
INVENTOR.
Sellers E. Jessup,
BY
Attorney.

Patented Jan. 9, 1945

2,367,030

UNITED STATES PATENT OFFICE 2,367,030

END PISTON RING

Sellers E. Jessup, Los Angeles, Calif.

Application January 16, 1943, Serial No. 472,583

4 Claims. (Cl. 309—44)

My invention relates to an end piston ring. It is well known that loss of fluid compression and oil pumping in motor cylinders occurs principally between the rings and receiving grooves of the piston and between the rings themselves and the cylinder walls. It is the primary object of this invention to provide improved means by which this objection is reduced to a minimum.

Another object of the invention is to provide an end piston ring by which the force of fluid compression exerted by the piston is employed to impel the ring into fluid tight connection both longitudinally against the end of the piston and laterally against the cylinder wall, whereby a more effective leak proof bearing between the piston and cylinder is produced, efficiency in operation is increased and leakage of lubricating oil is reduced to a minimum.

Another object is to prevent or reduce to a minimum the packing of carbon back of and between the piston ring and the surface of the piston.

These and other objects and advantages will be apparent from the following description and the accompanying drawing forming part thereof, in which, Fig. 1 is a view in central section of a portion of a cylinder wall and a portion of a cooperating piston, showing my invention applied thereto; Fig. 2 is a plan looking down upon the upper end of the piston showing my improved piston ring in place; Fig. 3 is a perspective view of my improved piston ring when removed from the piston; Fig. 4 is a section, partly in perspective, of a detail portion of a type of piston with which my improved piston ring is adapted to be used; Fig. 5 is a section of a detail portion of a piston, showing an alternative construction of my improved piston ring, and Fig. 6 is a sectional view of a detail, showing another alternative type of my improved piston ring applied in use on a piston.

My improved piston ring A is applicable to the inner end wall 10 and adjacent side surface of a piston such as B. The inner end wall or head of the piston is provided with an annular peripherial channel in its outer edge, which is divided into longitudinal steps 11 and 12 of increasing diameter rearwardly. These steps are separated longitudinally by a laterally extending annular bead or rib 13, which from its function may be termed an annular feather or key. This annular feather is suitably spaced longitudinally from the head 10 of the piston to assist in retaining the parts of my improved piston ring assembled in place on the inner end of the piston. This construction of the piston is clearly indicated in Fig. 4.

My improved piston ring as shown in Figs. 1 to 3 inclusive is composed of a main ring D and an inner ring E. The inner ring from its function may be termed a packing ring. The main outer ring D has an inner channel forming forward and rearward inner annular flanges 17 and 18, with a longitudinal connecting web 16 therebetween. This ring is split by an overlapping joint 19 to produce a resilient expansible structure which is held by its inner annular flange 18 below the laterally projecting annular feather 13 in the groove portion of the piston so as to press outwardly in close sliding contact against the side wall of cylinder C. In this position the forward flange 17 is spaced ahead of the feather 13 to provide an annular space in which a portion of the inner packing ring E is retained as will be hereinafter described. The forward surface of the main outer ring D, including the forward flange 17 is directly exposed to the full longitudinal force of fluid compression in the cylinder against the head of the piston so as to press the piston ring rearwardly, thus tending to seal the ring from leaking in its retaining channel or groove. It will be noted that the forward surface of the main outer ring is of comparatively large area, whereby a most effective seal is produced by the ring. It will also be noted that the outer ring D has a comparatively large bearing surface against the side wall of the cylinder in addition to its direct large exposure to the force of compression against the forward end of the piston in the cylinder. In this manner and by the end thrust thus produced against the rings, sealing tendency is augmented and the efficiency of operation of the piston and cylinder unit is greatly increased.

The inner packing ring E is of rectangular shape in cross section, one annular arm 22 thereof extending forwardly and the other annular arm 23 extending outwardly from the forward member. This angularly shaped ring is split by an overlapping joint 24 to produce a resilient expansion structure and is of suitable diameter so that the lateral member 23 may be interposed between the rearward side of flange 17 and the forward side of the feather 13 to produce an equalizing packing and so that the forward member 22 may closely seat between the step 11 in the piston head with its forward surface exposed to the force of fluid compression in the cylinder. In this manner the ring elements and piston are interlocked together. The forward surfaces of both rings B and C normally lie substantially in the plane of and flush with the forward end of the piston head whereby a large surface area is exposed and the members of the ring structure are pressed firmly upon their seats by the force of compressed fluid in the cylinder. The outer and inner rings are held together, by the dowel pin 25 or other suitable means, with limited free rotatable movement provided therebetween, and with the split overlapping joints 19 and 24 in staggered relation, to prevent leaking.

Suitable clearance spaces are provided between the inner adjacent surfaces of the outer and inner rings and between the rings and the body of the piston to permit free expansion thereof. By this means the rings are adapted to expand freely by the force of fluid compression with the outer ring expanded laterally into fluid tight working contact against the side wall of the cylinder.

It will be noted that the greater the force of compression exerted against the composite ring, the more firmly are the ring elements forced tightly against the end of the piston and against the side wall of the cylinder. Also that by the comparatively large area of direct exposure to the force of compression longitudinally against the ring structure an extremely tight and antileak bearing is produced, which is a distinct advantage over prior devices which have been produced.

It is not necessary to employ the packing ring E, broadly within the spirit of the invention. In Fig. 5 I have shown a modification of my invention in which a single channel ring F is shown freely but closely engaged over the annular radiating feather or key 13 and no packing ring is employed. In this construction the forward end surface of the ring is fully exposed and substantially flush with the end surface of the piston whereby the full force of fluid compression ahead of the piston tends to hold the ring tightly seated with its side surface also forced into tight engagement with the side wall of the cylinder.

In Fig. 6, the ring is substantially of the same construction as shown in Fig. 5, only an additional flat packing ring 26 is inserted between the feather or key 13 and the adjacent flange 27 of the ring to seal the gap between the split ends of the outer ring F. In this construction also, the end surface of the ring F is flush with the end surface of the piston and receives the full force of the compressed fluid in the cylinder ahead of the piston to hold the ring structure tightly sealed.

Among advantages attained by my improved piston ring are the following:

1. The provision of a piston in a piston and cylinder structure by which substantially no clearance need occur between the piston and the inner end of the cylinder, thus preventing loss of power.

2. By the provision of my improved ring structure substantially no loss of compression occurs due to leakage, either between side surfaces of the ring and the cylinder wall, or between the ring and the piston.

3. The substantial prevention of air, gas, oil or other fluid while under compression, leaking past the piston in a motor cylinder.

4. The higher the compression the tighter the ring elements are closed together against the piston and against the cylinder wall.

5. The provision of a ring structure in which the heat of compression is not retained between the cylinder wall and the ring space.

6. The provision of a ring structure by which lubricating oil is more effectively applied to reduce wear of the parts and more effectively seal the ring structure.

7. A further advantage is the prevention or reduction of carbon packing back of or between the parts of the piston ring and the surfaces of the piston.

In accordance with the patent statutes, I have described the principles of operation of my invention together with the construction thereof which I now consider to represent the best embodiment thereof, but I desire to have it understood that the construction shown is only illustrative and that the invention can be carried out by other means and applied to uses other than those above set forth within the spirit thereof and within the scope of the following claims.

I claim:

1. An end composite piston ring structure for application in an annular groove having a radiating annular feather in the head of a reciprocable piston, comprising, an outer expansible ring having a channeled portion on the inner side thereof, forming forward and rearward inward flanges with a web therebetween, said rearward flange being engaged and held by said feather with the forward flange substantially in the plane of said piston head and subject to the action of fluid compression against the head, and an expansible packing ring within the outer ring having a portion exposed on said head and a portion slidably interposed between the forward flange of the outer ring and the forward side of said feather to submit to the force of compression longitudinally of the piston below said forward flange.

2. An end composite piston ring structure, comprising, an outer expansible ring having a channeled portion on the inner side thereof, forming forward and rearward inwardly directed flanges with a web therebetween and an inner packing ring having an angular portion providing two members, one a forwardly annular arm having an external diameter less than the internal diameter of and extending forwardly through said forward flange, and the other an adjacent radiating annular arm within said channel and resting against the inner side of said forward flange, said radiating arm having an external diameter less than the internal diameter of said web to provide an expansible end thrust antileak seat.

3. A piston ring assembly, comprising, an outer annular split main member having a circumferential channel in its inner portion providing a pair of forwardly and rearwardly positioned inwardly directed flanges and adapted to seat with its forward flange in the outer edge of a piston head and with its rearward flange engaged by an annular feather in the side of the piston, and an annular split packing member having a bearing member movably engaged below said forward flange and adapted to be impressed tightly against the forward side of said feather by said outer main member under the force of compression directed against said head, and a forwardly extending annular arm engaged freely within said forward flange, the forward surfaces of said forward flange and arm lying substantially in the plane of the head of the piston to be exposed to the full force of fluid compression against the head.

4. An end piston ring structure for use in an annular groove in the forward end of a reciprocable piston, said piston having a radiating annular feather in said groove, comprising, an outer expansible piston ring in said groove having an inner annular channel providing forward and rearward inwardly directed annular shoulders, the rearward shoulder engaging inwardly below and held by said feather, and an inner expansible piston ring within the outer ring having a radiating annular portion engaging outwardly below said forward annular shoulder and impressed longitudinally against the forward side of said feather, the extreme forward surfaces of said rings being exposed to the full force of fluid compression against the head of the piston.

SELLERS E. JESSUP.